United States Patent [19]
Hopler et al.

[11] Patent Number: 5,680,492
[45] Date of Patent: Oct. 21, 1997

[54] SINGULAR FIBER TO BUNDLE ILLUMINATION WITH OPTICAL COUPLER

[75] Inventors: Mark D. Hopler, Santa Rosa; Glenn P. Empey, Santa Clarita; Zafirios Gourgouliatos, Studio City, all of Calif.

[73] Assignee: Cogent Light Technologies, Inc., Santa Clarita, Calif.

[21] Appl. No.: 509,768

[22] Filed: Aug. 1, 1995

[51] Int. Cl.$^6$ .................................................. G02B 6/32
[52] U.S. Cl. ........................... 385/34; 385/46; 385/119
[58] Field of Search ............................... 385/461, 341, 385/281, 119

[56] References Cited

U.S. PATENT DOCUMENTS

| | | | |
|---|---|---|---|
| 4,471,659 | 9/1984 | Udd et al. | 73/655 |
| 4,522,461 | 6/1985 | Mannschke | 350/96.18 |
| 4,637,683 | 1/1987 | Asawa | 350/96.18 |
| 4,668,093 | 5/1987 | Cahill | 356/345 |
| 4,682,846 | 7/1987 | Cowen | 350/96.18 |
| 4,757,431 | 7/1988 | Cross et al. | 362/261 |
| 4,842,355 | 6/1989 | Gold et al. | 350/96.2 |
| 5,016,963 | 5/1991 | Pan | 385/33 |
| 5,453,827 | 9/1995 | Lee | 356/73.1 |
| 5,555,330 | 9/1996 | Pan et al. | 385/39 |

FOREIGN PATENT DOCUMENTS

| | | |
|---|---|---|
| 0251623 | 1/1988 | European Pat. Off. |
| 0361751 | 4/1990 | European Pat. Off. |

*Primary Examiner*—John Ngo
*Attorney, Agent, or Firm*—Rothwell, Figg, Ernst & Kurz, P.C.

[57] ABSTRACT

A gradient index (GRIN) lens couples light from a single fiber optic into a fiber bundle or directly into the input port of an illumination device, such as a medical illumination device. The single fiber optic provides a high intensity beam of light having a high NA. An entry face of the GRIN lens is positioned adjacent to an exit aperture of the fiber within the near field of the fiber and thereby receives a beam having a substantially uniform cross-section, rather than a Gaussian cross-section as would occur with the GRIN lens positioned in the far field of the fiber. An exit face of the GRIN lens is positioned adjacent to the fiber bundle or input port of the illumination device. As such, the GRIN lens effectively images the exit aperture of the fiber of the input aperture of the fiber bundle as input port. The optical characteristics of the GRIN lens, including its length and radial variation in index of refraction, are selected to reduce the NA of light output from the fiber to a value appropriate for use with the illumination device. An optical coupler employing the GRIN lens is described as well as an entire optical system including a source of light, a off-axis coupler for coupling light into the fiber, a gradient index lens, and an endoscope. A mechanical housing for holding the single fiber and GRIN lens and for facilitating connection to a fiber bundle or input port is also described.

35 Claims, 4 Drawing Sheets

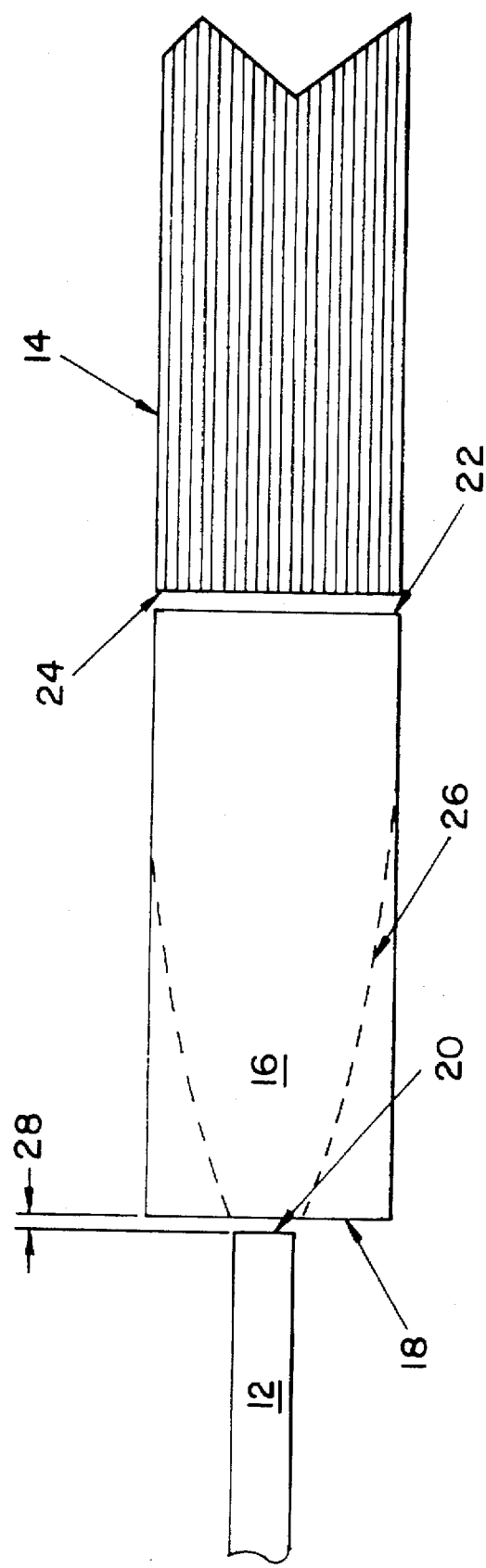

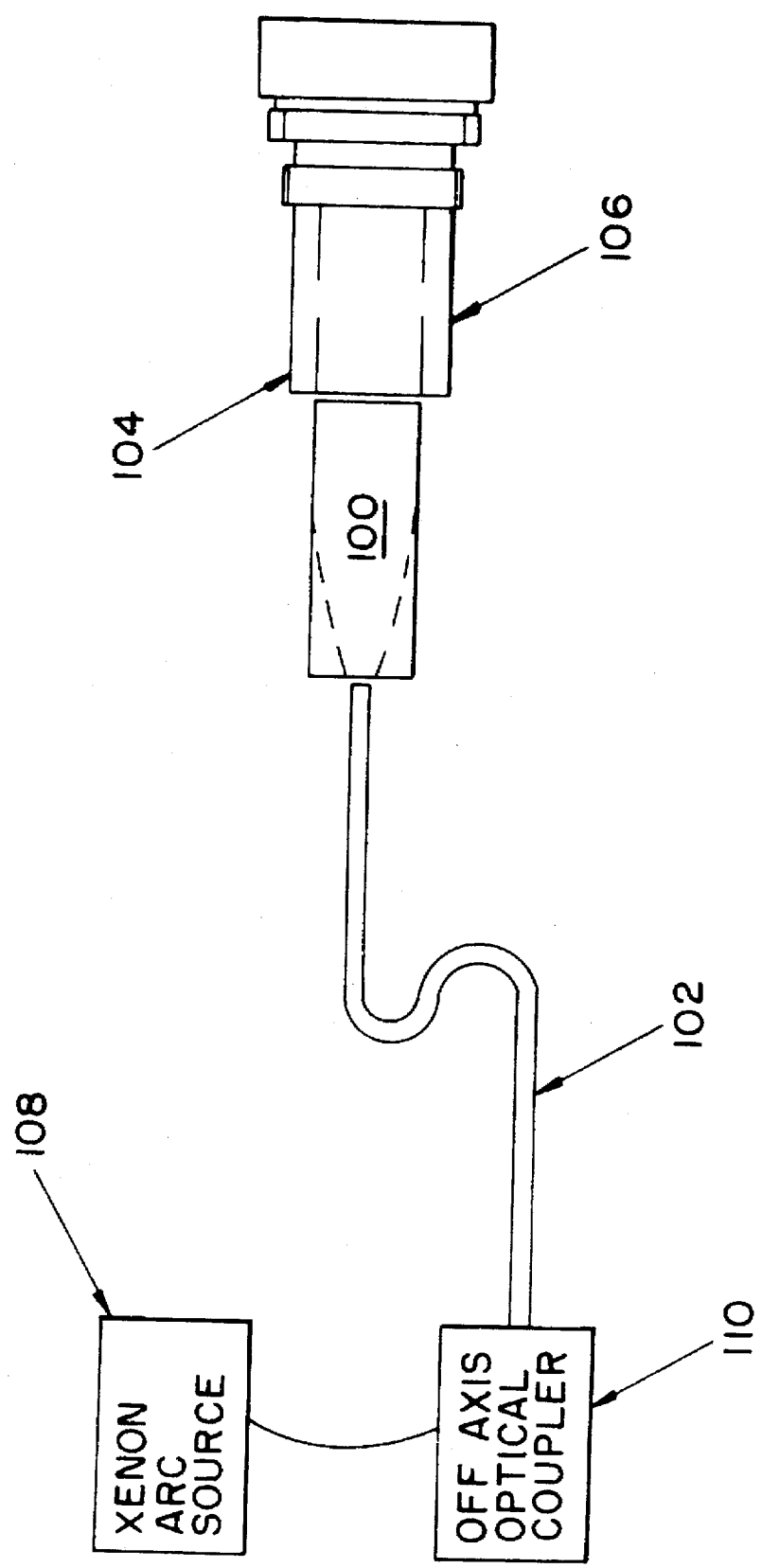

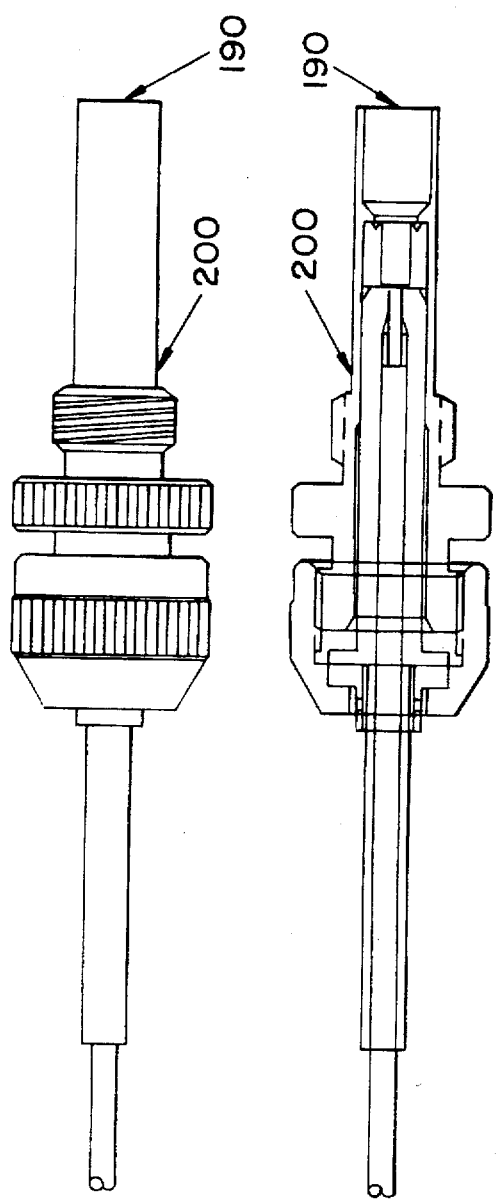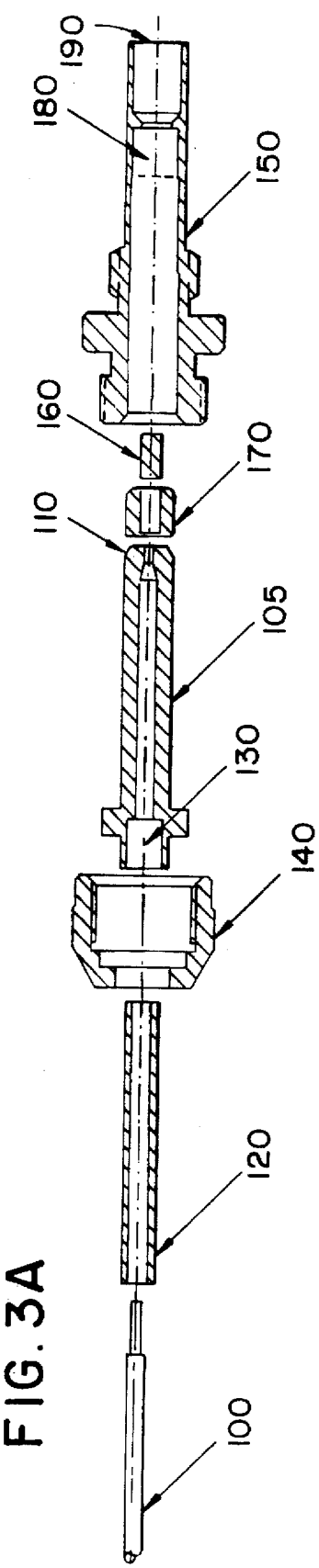
FIG. 3C  FIG. 3B  FIG. 3A

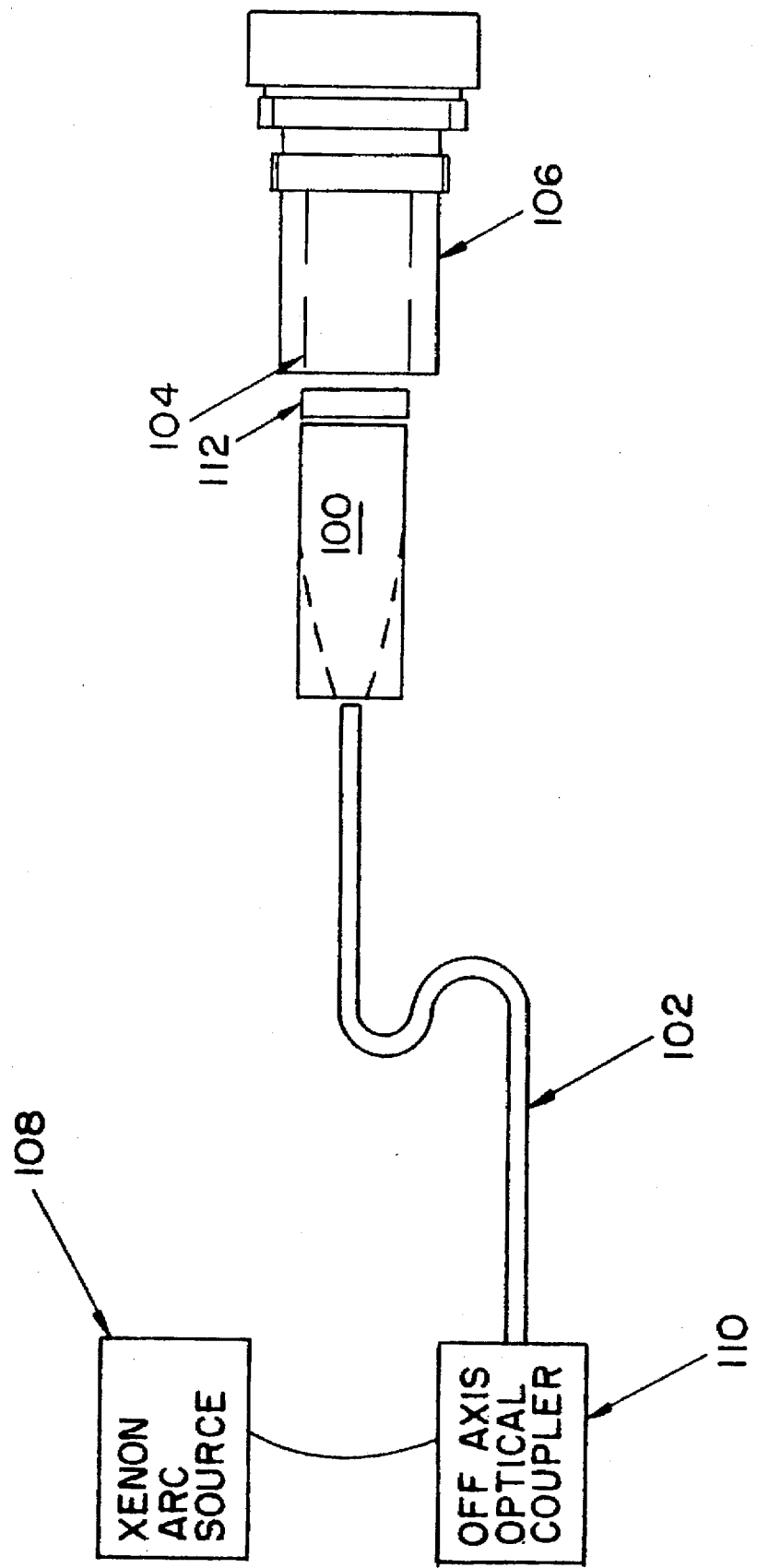

SINGULAR FIBER TO BUNDLE ILLUMINATION WITH OPTICAL COUPLER

BACKGROUND OF THE INVENTION

1. Field of the Invention

The invention generally relates to optical couplers and in particular to optical couplers for coupling light from one fiber optic or fiber optic bundle into another fiber optic or fiber optic bundle.

2. Description of Related Art

Often it is desirable to couple light from a fiber optic bundle into another bundle or into an optical illumination device. Examples include medical illumination devices such as endoscopes, borescopes and surgical head lamps or luminaires. With such medical illumination devices, light is typically coupled into the device either by connecting a fiber optic bundle directly into the device or by coupling a fiber optic bundle to a second bundle connected to the illumination device.

Internal optical components of these medical illumination devices are configured to operate properly when receiving light from a fiber bundle having a certain range of numerical apertures. More specifically, fiber bundles are extended sources requiring that the output characteristics of the receiving illumination device be configured to match the optical characteristics of the light delivering fiber bundle. The connection of a fiber bundle having a different numerical aperture may render the medical illumination device ineffective for its intended purposes. If a fiber bundle having an insufficiently low NA is connected to the medical illumination device, an output beam from the device may have insufficient beam width for properly illuminating a surgical field of interest. In general, light should be coupled into the illumination device with a suitable NA and a generally uniform beam cross-section. Conventional optical sources for use with such illumination devices employ fiber bundles which provide light having the requisite uniformity and NA.

It should be noted that almost medical illumination devices perform differently, even two different scopes of the same manufacturer and model. This appears to be true regardless of the input.

Cogent Light Technologies, the assignee of rights to the present application, provides an optical source for use with medical illumination devices which employs a single optical fiber light delivery system in place of a fiber bundle. One advantage of a single fiber over a fiber bundle is that a single fiber approaches a point source having more precisely defined optical properties than a fiber bundle. The single fiber provides a very high intensity output beam with high energy concentration at the fiber tip.

However, to connect a single fiber light delivery system to the input port of an illumination device having a fiber bundle requires tailoring the light output from the single fiber to match the characteristics of the light delivering bundle inside the illumination device. To achieve this, an optical coupler is needed to transform the NA and Gaussian distribution of the fiber into optical characteristics that will achieve a match between light from the single fiber and the input port of the illumination device. An example of a simple optical coupler is a device which places the exit aperture of the single fiber adjacent to the entrance aperture of the fiber bundle, thereby providing a "butting" contact. Simple butting contact of the single fiber to the multiple fiber can result in damage to the fiber bundle as a result of the high intensity of the output beam from the single fiber, and as a result of the high concentration of energy at the fiber tip of the single fiber. Moreover, depending on how closely positioned such a butting contact is made, illumination of the bundle by the fiber may result in light being coupled preferentially into the center-most fibers of the bundle potentially causing a non-uniform distribution of light at the distal end of the bundle if the fibers in the bundle are not randomly dispersed inside the illuminating device. Such a nonuniform distribution of input may further degrade the performance of the medical illumination device.

Another method for coupling a fiber to a bundle is to position a lens between the single fiber and the bundle to collimate light output from the single fiber into the bundle. Although such a configuration provides better coupling into the perimeter fibers of the bundle, the resulting NA of light within the bundle may be insufficient for use with the medical illumination device. Moreover, the entrance plane of the fiber bundle is within the far field, and therefore the impinging light at the entrance of the bundle has a Gaussian distribution, rather than uniform distribution, as would occur in the near field. Hence, even if the reduced NA is not a problem, the lack of uniformity of the beam may still represent a problem.

Although discussed primarily with reference to coupling a single fiber to a fiber bundle, the foregoing problems occur when coupling a single fiber directly to the input port of an illumination device containing a bundle, such as an endoscope. For endoscopes, the problem is made more complicated in that their configuration may include optical systems for matching the input NA of the endoscope to a larger NA of the field of view for achieving a larger field of illumination. A common method for achieving a larger field of illumination having a higher NA to match the field of view is to employ a cone at the input of the endoscope. In this case, the optical coupling of a single fiber to a higher NA bundle contained inside of the endoscope is achieved by increasing the effective NA of the light entering the endoscope. For scopes of this design additional techniques are required for matching the output of the single fiber to the optical design of the endoscope. A similar problem exists in coupling light from a single fiber into a non-randomized fiber bundle. Coupling smaller fiber bundles to larger bundles can also involve optical matching problems.

It is noted that some illumination devices use input ports which include a compound parabolic concentrator (CPC) that couples light into a smaller, high NA bundle of fibers that resides below the CPC within the illumination device. Similar problems to those described above also apply when attempting to couple a single fiber to an input port having a CPC.

A coupling system, appropriate for some applications, is to mount a microlens at the exit aperture of a single fiber optic to increase the NA of the exiting light, then to position a gradient index (GRIN) lens between the microlens and the entrance aperture of a fiber optic bundle. The apparent purpose of the microlens is to match the NA of the fiber to that of the GRIN lens. An example is described in U.S. Pat. No. 5,016,963 to Pan. Based on our analysis, however, the use of the microlens in combination with the GRIN results in a non-uniform beam coupled into the fiber bundle. Moreover, the system of the '963 patent is specifically intended for communication systems where the signal form and integrity in the time domain must be preserved, but where the spatial profile of the signal is not important and hence may not be appropriate for use with medical illumination devices. In addition to the fact that Pan uses a micro lens, the bundle fiber ends on the proximal side of the bundle are tapered. Furthermore, the system of the '963 patent is apparently designed to create a point source in the focal plane of the GRIN lens so as to produce a collimated beam in the GRIN image space which again may not be appropriate for use with medical illumination devices.

It would be desirable to provide an improved method for coupling fibers or fiber bundles to other fibers or fiber bundles, or optical input ports connected to fiber bundles in a manner which provides a sufficient NA to match that of the bundle while also ensuring beam cross-section uniformity. It is to these ends that aspects of the present invention are drawn.

SUMMARY OF THE INVENTION

In accordance with one aspect of the invention, improved optical coupling from a single fiber or a small diameter fiber bundle is achieved by positioning a GRIN lens near the exit aperture of the single fiber or fiber bundle. The GRIN lens effectively magnifies the output beam from the fiber or fiber bundle while preserving the cross-sectional uniformity of the beam. The function of the GRIN lens is to image the face of the single fiber where illumination is uniform, onto the entrance face of the fiber bundle. The cross-sectional uniformity of the beam is preserved by positioning an entrance face of the GRIN lens within the uniform near field, rather than in the Gaussian fir field, of the fiber. Depending upon the application, the output beam from the GRIN lens may be coupled into a large diameter single fiber, a fiber bundle or the input port of an optical device, such as an endoscope. In addition to preserving beam uniformity, the NA of light coupled into the large diameter single fiber, fiber bundle or input port can be selected or controlled by employing a GRIN lens having suitable characteristics.

In one exemplary embodiment, the object, which is the single fiber, is magnified approximately 6.5 X. The system has a large depth of focus. Due to the large depth of focus of the system, the positional tolerances in image space are quite loose, and the magnification is easily adjusted.

Hence, by employing a GRIN lens and by mounting the GRIN lens with an entrance face within the near field of the exit aperture of the single fiber or small diameter fiber bundle, the disadvantages described above in conventional optical coupling systems are avoided. Moreover, the coupler of the invention, which employs only a GRIN lens, is a relatively simple, inexpensive and reliable system.

In an exemplary embodiment, the GRIN lens optical coupler is mounted to the exit aperture of a single fiber optic receiving a light beam having a high NA from an off-axis optical system coupled to a high intensity source, such as a xenon arc lamp. By coupling light into the single fiber with high NA, no additional optical magnification device, such as a microlens, is required. Furthermore, since no microlens is required, the GRIN lens may be positioned within the near field of the fiber optic, thereby ensuring uniformity of beam cross-section. If a microlens were required, the positioning of the entry face of the GRIN lens would likely be in the far field of the fiber optic, thereby receiving a non-uniform Gaussian light distribution, resulting in a non-uniform beam coupled into the optical illumination device of interest.

Also in accordance with the invention, a mechanical housing is provided for releasably coupling the single fiber, the GRIN lens, and the fiber bundle or input port together. The mechanical coupler mimics the external configuration of existing universal cable connectors for medical illumination devices, such as endoscopes to allow easy coupling into devices adapted to receive universal cable connectors. The interior of the configuration of the connector, however, is configured to hold the single fiber and GRIN lens together. The mechanical components of the connector include an optical housing or universal connector body, a fiber crimp tube or fiber housing and an SMA cap which holds the fiber crimp tube into the optical housing. The fiber is held into the fiber crimp tube by a crimp on the outer diameter of the tube. This positions the output aperture of the single fiber optic at a location almost touching the GRIN lens when the tube is installed into the universal connector. The fiber crimp tube, when installed into the universal connector, is positioned such that the concentricity of the fiber is held to close tolerance relative to the GRIN lens with minimal flit. This is accomplished by manufacturing all relative features to close concentricity dimensions and by locating the fiber crimp tube between the SMA cap and the universal connector. In this manner, the output beam from the GRIN lens has a substantially uniform cross-section.

The GRIN lens coupler also may be used in combination with other optical devices, in particular diffusers, to randomize the beam profile emitted by the GRIN lens. Use of a diffuser in combination with the GRIN diffuser and a fiber optic light delivery system facilitates the formation of a more uniform output beam from bundles which are not fully randomized or which have a glass cone at the input to the bundle for increasing the NA of the incoming light. The diffuser is placed between the GRIN lens and the input to the bundle and may be mounted either in the releasable housing or in the universal adapter.

The invention overcomes the disadvantages noted above, in part, by providing a uniformly illuminated field at the input of a fiber bundle of larger diameter and eliminates hot spots that may damage a fiber bundle. Other aspects of the invention as well as other advantages and features of the invention will be apparent from the drawings and the detailed description which follows.

BRIEF DESCRIPTION OF THE DRAWINGS

FIG. 1 illustrates an exemplary embodiment of the invention wherein a GRIN lens is employed to couple a single fiber optic to a fiber bundle.

FIG. 2 illustrates an alternative embodiment of the invention wherein a GRIN lens couples a single fiber optic into the input optical port of an endoscope. FIG. 2 also illustrates, in block diagram form, a source for coupling light into the fiber optic.

FIG. 3a is an exploded cross-sectional view of an optical coupler incorporating a GRIN lens illustrating the mechanical components.

FIG. 3b is a cross-sectional view of the coupler of FIG. 3a shown assembled.

FIG. 3c is a sideview of the assembled coupler of FIG. 3b.

FIG. 4 illustrates an alternative embodiment of the invention wherein a GRIN lens couples a single fiber optic into the input optical port of an endoscope with a diffuser positioned between the GRIN lens and an endoscope entrance port.

DETAILED DESCRIPTION OF EXEMPLARY EMBODIMENTS OF THE INVENTION

Referring to the figures, exemplary embodiments of the invention will now be described.

In the following, the invention will primarily be described with reference to an exemplary embodiment wherein light output from a single optic fiber is coupled into a fiber bundle or into the input port of an endoscope. However, principles of the invention may be applied to other applications, such as coupling light from a small diameter bundle into a larger diameter bundle, coupling light from a small diameter fiber into a larger diameter fiber, etc.

FIG. 1 illustrates an optical system including a single optic fiber 12 and a fiber bundle 14 coupled together by a GRIN lens 16. A leading face 18 of GRIN lens 16 is disposed immediately adjacent to an exit aperture 20 of fiber 12. Likewise, a trailing edge 22 of GRIN lens 16 is disposed adjacent to an entrance aperture 24 of fiber bundle 14.

A high intensity beam of light, having a relatively high NA, is transmitted from fiber 12 through GRIN lens 16 into bundle 14. Dashed lines 26 illustrate the outer diameter of the beam as it passes through GRIN lens 16. As can be seen, the GRIN lens, which has an index of refraction which varies with radial distance from a center of the lens, acts to broaden the effective diameter of the beam until it substantially matches the input diameter of fiber bundle 14. The degree to which GRIN lens 16 expands the diameter of the beam depends upon the length of the GRIN lens as well as upon the particular optical characteristics of the lens, including the profile of the index of refraction. For most, or all, conventional optic fibers and fiber bundles, an appropriate GRIN lens can be fabricated or purchased which expands the beam to substantially equal the diameter of the fiber bundle. Hence, no significant amount of light is lost.

In an exemplary embodiment, single fiber 12 has a diameter in the range of 0.1 millimeters to 1.0 millimeters, although the invention is not limited to this range. The NA of the fiber is greater than about 0.5. Fiber bundle 14 has a diameter in the range from 1.0 millimeters to 6.5 millimeters, or higher. The expected NA of an illumination device, not shown, connected to the fiber bundle is between 0.25 NA and 0.6 NA. An appropriate GRIN lens for use in such an embodiment may be obtained from companies such as Nippon Sheet Glass and one such lens is sold under the trade name SELFOC.

More specific exemplary parameters for the system are as follows. NA of fiber is ~0.636, GRIN Pitch is 0.25, the refractive index varies radially, with a base (axial) index of 1.6576, the fiber bundle entrance diameter is 5.0 mm, and the spacing between the GRIN and the 5.0 mm bundle is 7.11 mm with a slight underfill.

It should be noted that no microlens is required at the exit of fiber optic 12 to increase the NA of the fiber, yet adequate beam expansion occurs. This is in part due to the high NA of light transmitted through the single fiber optic. Also, entry face 18 of the GRIN lens is positioned within the near field of the exit aperture of the fiber. In FIG. 1, the near field is identified by reference numeral 28. As noted above, the spatial profile of the beam transmitted from the optic fiber is substantially uniform within the near field. Beyond the near field, spatial the profile of the beam becomes Gaussian, and is therefore no longer uniform. By positioning the entry face of the GRIN lens within the near field of the fiber, the spatial uniformity of the beam is maintained. This is particularly important for applications wherein the fiber bundle feeds light into a medical illumination device, such as an endoscope, where a spatially uniform field of illumination is required. Also, for illumination devices which expect an input beam having a certain NA, care should be taken to select or fabricate a GRIN lens which converts the NA of the beam output from the fiber to the appropriate NA of the medical device. For example, when used in combination with a fiber transmitting light with a very high NA, it is desirable to employ a GRIN lens which reduces the NA of the beam to that expected by the illumination device. Again, such can be achieved with selection or fabrication of a GRIN lens having appropriate diameter, length and index of refraction.

Moreover, it can be shown that a fiber of smaller NA than that of the GRIN when coupled to the GRIN will provide a sufficiently uniform field of illumination if the distance between GRIN and bundle is adjusted appropriately. This is true because the GRIN images the end of the single fiber. As long as the spatial intensity distribution at the end of the single fiber is uniform, so then will be its image.

FIG. 2 illustrates an embodiment of the invention where a GRIN lens 100 couples a single optical fiber 102 into the input port 104 of an endoscope 106. In FIG. 2, the details of the configuration of the endoscope are not provided. The system of FIG. 2, also illustrates a system for coupling light into an entrance aperture of fiber 102 with high NA. In particular, light from a high intensity xenon lamp 108 is coupled into the fiber using an off-axis optical coupler 110. Off-axis coupler 110 is referred to as being "off-axis" because it is capable of coupling light from a source which is not along an optical axis of the input of the fiber into the fiber. An example for a suitable off-axis coupler is provided in U.S. Pat. No. 4,757,431 to Cross and assigned to the assignee of rights to the present application. The patent to Cross is incorporated by reference herein.

To enable transmission of a high intensity beam within the single fiber, off-axis coupler 110 couples light into the fiber with a very high NA. Endoscope 106, however, includes internal components, not shown, which are configured with the expectation of receiving a light beam having a lower NA. Accordingly, the characteristics of GRIN lens 100 are selected to reduce the NA of light emitted from the fiber into a range appropriate for use with endoscope 106. As with the embodiment of FIG. 1, GRIN lens 100 is positioned with its entry face within the near field of fiber 102, thereby ensuring that a uniform beam is coupled into endoscope 106.

Hence, FIGS. 1 and 2 illustrate optical couplers wherein light is coupled using the GRIN lens from a single fiber into either a fiber bundle or the input port of a medical device. In either embodiment, it is desirable to employ a mechanical housing around the GRIN lens and single fiber, to facilitate coupling into conventional fiber bundles for conventional illumination device input ports.

FIG. 3A illustrates a mechanical configuration of just such a connector. A single fiber 101 is positioned in a fiber support tube 105 such that the fiber end is in the plane 111 to some tolerance. The fiber is also passed through a crimp tube 120 and a threaded SMA cap 140 that holds the fiber support tube 105 in an adapter body 150. The crimp tube is fitted in an end section 130 of fiber support tube 105. Before fiber support tube 105 is positioned in adapter body 150, a GRIN lens 160 is sweaged into a GRIN mount 170. This assembly is then press fit into adapter body 150 at position 180.

FIGS. 3B and 3C illustrate the adapter in its assembled form, 200. Once the adapter is assembled, the entrance aperture of the endoscope or like instrument resides at the plane 190.

FIG. 4 illustrates an embodiment similar to that of FIG. 2 but with a diffusing element 112 placed at the entrance plane of the device being adapted to the single fiber. The purpose of the diffusing element is to diffuse the light in a manner similar to the manner by which light emanating from the end of a fiber bundle is diffused. Examples of diffusive elements that can be used include orthogonally crossed arrays of cylindrical lenses, fly-eye type lenses, ground glass, etc.

What has been described is an optical system incorporating a GRIN lens. The system has been described primarily with reference to exemplary embodiments wherein the GRIN lens couples light from a single fiber into either a fiber bundle or the input port of a medical illumination device. However, principles of the invention may be applied to a variety of systems, for a variety of applications, to achieve a variety of ends. Accordingly, the exemplary embodiments herein should not be construed as limiting the scope of the invention.

We claim:

1. An optical coupling system comprising:
    a light delivery system having a first numerical aperture (NA) and providing an output beam uniform in a near field and Gaussian in a far field;
    a gradient index lens having an input face positioned within the near field of the light, delivery system, a second NA, and an exit face,
    a light receiving system having a third NA and having a clear aperture positioned adjacent to an exit race of the gradient index lens such that the light exiting the gradient index lens expands to fill the clear aperture of the light receiving system; and
    wherein light from the gradient index lens is transmitted through the light receiving system at a substantially uniform beam width.

2. The optical coupling system of claim 1 wherein the third NA of the light receiving system is matched to the second NA of the gradient index lens and wherein the first NA of the light delivering system is less than or equal to that of the gradient index lens.

3. The optical coupling system of claim 1 wherein the light delivery system is a single optic fiber.

4. The optical coupling system of claim 3 wherein the light delivery system is a single fiber optic with an NA greater than about 0.5.

5. The optical coupling system of claim 3 further comprising means for coupling light into a remote end of the single fiber optic.

6. The optical coupling system of claim 5 wherein the means for coupling light into the remote end of the single fiber optic is a high intensity source optical coupler system.

7. The optical coupling system of claim 3 wherein said light delivery system is free from any optical magnification devices between said light delivery system and said gradient index lens such that said gradient index lens receives light directly from the light delivery system.

8. The optical coupling system of claim 1 wherein the light receiving system is a fiber optic bundle.

9. The optical coupling system of claim 8 wherein the gradient index lens is substantially cylindrical and wherein the fiber optic bundle is likewise cylindrical and has an outer diameter substantially equal to an outer diameter of the gradient index lens.

10. The optical coupling system of claim 8 wherein the fibers in said fiber optic bundle are generally constant and free from tapering on a proximal side thereof.

11. The optical system of claim 1 further comprising:
    a housing mounting said gradient index lens to said optical element, said housing having a universal connector for mounting to said light receiving system.

12. The optical coupling system of claim 11 wherein the housing includes
    a gradient index lens mount for receiving and holding the gradient index lens;
    a crimp tube for receiving and holding the single optic fiber;
    a fiber support tube for receiving and holding the crimp tube; and
    an adapter body for receiving and holding the fiber support tube and the gradient index lens mount, said adapter body further having said universal connector for mounting to an input port of said light receiving system.

13. The optical coupler of claim 1
    wherein the light delivery system is a single optic fiber having a diameter in the range of 0.1 millimeters to 1.0 millimeters;
    wherein the light receiving system is a fiber optic bundle having a diameter in the range from 1.0 millimeters to 6.5 millimeters; and
    wherein the gradient index lens has a numerical aperture in the range of 0.25 NA and 0.6 NA.

14. The optical coupling system of claim 1 wherein the light receiving system is a medical illumination device.

15. The optical coupling system of claim 1 wherein said light delivery system is a single optic fiber having a substantially constant outer diameter to an output end face thereof.

16. The optical coupling system of claim 15 wherein said single fiber optic is generally cylindrical up to said end face and said end face is substantially flat.

17. The optical coupling system of claim 16 wherein said single fiber optic is generally axially aligned with an axis of said gradient index lens.

18. The optical coupling system of claim 1 in which an optical diffuser is positioned between the gradient index lens and the light receiving system.

19. The optical coupling system of claim 1 wherein the spatial profile of the light is uniform in the near field and said gradient index lens maintains the uniformity of the spatial profile.

20. The optical coupling system or claim 1 wherein said light delivery system is a single fiber and said light receiving system has a diameter substantially greater than the diameter of said single fiber and is selected from the group consisting of a large diameter single fiber, a fiber bundle, and an input of an optical device.

21. The optical coupling system of claim 20 wherein the diameter of said light receiving system is over 6 times that of the diameter of said single fiber of said light delivery system.

22. The optical coupling system of claim 20 further including a mechanical housing for releasably coupling the single fiber of said light delivery system at a location almost touching the GRIN lens.

23. The optical coupling system of claim 1 wherein said receiving system receives said beam in a manner to prevent converging of said beam into a single fiber or point light source.

24. An optical system comprising:
    means for transmitting a beam of electromagnetic radiation, said beam having a high numerical aperture and being substantially uniform in a near field and Gaussian in a far field:
    a gradient index lens means, having an input face positioned within the near field, for expanding a width of the beam while substantially preserving beam uniformity to form a beam of expanded width; and
    means for receiving said expanded width beam, said expanded width beam being transmitted within the receiving means while maintaining the expanded width.

25. The optical coupling system of claim 24 wherein said receiving system receives said beam in a manner to prevent converging of said beam into a single fiber or point light source.

26. An optical system for coupling light from a light delivery system into a light receiving system wherein a light delivery system has a first numerical aperture and provides an output being uniform in a near field and Gaussian in a far field and wherein the light receiving system has a second numerical aperture and a clear aperture, said optical coupling system comprising:

a gradient index lens having an input face, a second numerical aperture and an exit face;

means for coupling the gradient index lens to the light delivery system and to the light receiving system wherein said input face of said gradient index lens is positioned within the near field of the light delivery system and wherein said exit face of said gradient index lens is positioned adjacent to the clear aperture of the light receiving system; and wherein light from the gradient index lens is transmitted through the light receiving system at a substantially uniform beam width.

27. The optical coupling system of claim 26 wherein a numerical aperture of the light receiving system is matched to a numerical aperture of the gradient index lens and wherein the numerical aperture of the light delivery system is less than or equal to that of the gradient index lens.

28. The optical coupling system of claim 26 wherein a light delivery system is a single optic fiber.

29. The optical coupling system of claim 28 wherein the light delivery system is free from any optical magnification devices between said light delivery system and said gradient index lens such that said gradient index lens receives light directly from the light delivery system.

30. The optical coupling system of claim 26 wherein the light delivery system is a single optic fiber having a substantially constant outer diameter to an output end face thereof.

31. The optical coupling system of claim 30 wherein said single fiber optic is generally cylindrical up to said end face and said end face is substantially flat.

32. The optical coupling system of claim 31 wherein said single fiber optic is generally axially aligned with an axis of said gradient index lens.

33. The optical coupling system of claim 26 wherein the light receiving system includes a fiber optic bundle and the fibers of said fiber optic bundle fiber are generally constant and free from tapering on a proximal side thereof.

34. The optical coupling system of claim 26 wherein the spatial profile of the light is uniform in the near field and said gradient index lens maintains the uniformity of the spacial profile.

35. The optical coupling system of claim 26 wherein said receiving system receives said beam in a manner to prevent converging of said beam into a single fiber or point light source.

* * * * *